United States Patent Office 3,424,735
Patented Jan. 28, 1969

3,424,735
MANUFACTURE OF SHAPED STRUCTURES MADE FROM THERMOPLASTIC SYNTHETIC MATERIALS
Gerhard Buchheister, Wiesbaden-Biebrich, and Markus Seibel, Mainz, Germany, assignors to Kalle Aktiengesellschaft, Wiesbaden-Biebrich, Germany, a corporation of Germany
No Drawing. Filed June 8, 1965, Ser. No. 462,436
Claims priority, application Germany, June 11, 1964, K 53,192
U.S. Cl. 260—93.7                    14 Claims
Int. Cl. C08f *47/14;* C08g *53/16*

This invention relates to a process for modifying the surface of shaped structures made from thermoplastic synthetic materials.

Films made from thermoplastic synthetic materials are widely used for packaging purposes. Bags and packages are generally manufactured by welding, sealing or cementing. In the cementing method, it is necessary to apply an adhesive to the film as an additional step shortly before bonding, which makes the process complicated. Welding consists in heating the thermoplastic films to their softening temperature at the area where they are to be joined and then fusing them. However, there are difficulties associated with welding films that have been orientated in one or more directions during their manufacture in order to increase the strength. For example, biaxially stretched polypropylene films can not be heated to their softening point for welding in spite of their thermoplastic properties. The reason is that, in this temperature range, disorientation takes place, the film shrinks considerably, and a perfect, wrinkle-free joint can not be obtained.

For this reason, attempts have been made to modify the surfaces of sheet-like structures in a manner such that sealing can be performed at temperatures lower than those at which undesirable distortion takes place. The term "sealing" is used to describe a process in which only one surface and not the whole film, in some cases a surface layer which is applied separately, participates in the formation of the bond by the application of heat. Whereas the so-called sealing layers fuse together, the structure of the sheet-like material below remains unimpaired. Compounds that soften at lower temperatures than the films have already been used as sealing layers, the compounds being applied in the form of solutions, dispersions or melts. When heat is applied to these layers which soften at low temperatures, orientated films can be bonded together without undesirable shrinkage occurring at the seams.

It is also known to produce a desired layer which is capable of being softened by applying substances to a film and then polymerizing them with the assistance of catalysts. It is also possible to render the surface of a polyolefin film sealable to a slight degree by means of electrical discharges. For example, it is possible to impart a certain degree of sealability to a film surface by subjecting it to a very intensive treatment with electrical discharges in air. However, the degree of sealability obtained in this way is not sufficient for practical purposes. The effect is improved somewhat by exposing the film surface to electrical discharges in the presence of polymerizable monomers. However, the degree of sealability achieved thereby is likewise inadequate under the treatment and sealing conditions employed.

In the present invention, the surface of a shaped structure, more epecially a film, made from a thermoplastic synthetic material is rendered sealable by the action of electrical discharges, when the surface is exposed to an electrical discharge in an atmosphere containing a halogen gas and in the presence of a polymerizable monomer.

The sealing temperature of the structure is reduced to such an extent by the treatment of the invention that sealing can be performed in a temperature range in which no noticeable heat-shrinkage takes place. The process of the invention is therefore specially suitable for the sealing of stretched films, for example, films made from polypropylene. However, it can also be employed with advantage in the sealing of unstretched films made from polyolefins, for example, low-density and high-density polyethylene, polybutadiene and sheet-like structures made from polyvinyl chloride and polyethylene terephthalate. To perform the treatment of the invention, a device can be used which is normally employed in the corona treatment of films. The device comprises a grounded roller with an insulated surface, which roller seals the open side of an otherwise gas-tight box mounted upon it, the box being provided with gas supply pipes and electrodes running parallel to the roller surface, which electrodes may be in the form of wires, a grid or strips.

The atmosphere in the box is regulated by means of gas supply pipes. The halogen used is preferably chlorine or a mixture of chlorine and air, nitrogen or other gases. However, it is also possible to use bromine vapor, either alone or in admixture with chlorine and the above-mentioned inert gases. When the monomers to be used in the process of the invention are in a gaseous state, they are likewise advantageously introduced into the reaction zone through the gas supply pipes. Monomers that are not in a gaseous state can be introduced into the reaction zone by dissolving them in a solvent, for example, trichlorethylene, and blowing nitrogen through the solution. Another means of introducing non-gaseous monomers into the reaction zone is to apply them to the surface to be treated by spraying or dipping.

Polymerizable monomeric compounds suitable for forming a sealable surface by the process of the invention are those that contain a vinyl group, for example, vinyl acetate, vinyl chloride, acrylic acid and the esters thereof, styrene, methyl styrene, acrylonitrile, chloro-acrylonitrile or vinyl ether, or vinylidene chloride, maleic anhydride, diallyl itaconate and hexachlorobutadiene, the monomers being used either singly or in admixture one with another.

In the following table the sealing strengths for a biaxially orientated polypropylene film having a thickness of $12\mu$, obtainable by various known processes, are compared with the sealing strength obtainable by the process of the invention. The sealing strength is measured by the force required to separate a bonded strip 1 cm. wide which has been sealed under specified conditions. A sealing strength from 80 to 100 grams per centimeter can be considered adequate for packaging purposes. In the case of a thin film, the possibility of measuring the requisite strength of a sealed seam is often limited by the strength of the film itself. In such cases the sealing strength quoted in the following table is prefixed by the "greater than" sign.

TABLE

| Treatment | Sealing strength at 135° C. (0.8–1 kp./cm.² pressure and a sealing time of 2 seconds) |
|---|---|
| Untreated | No adhesion. |
| Electrical discharge in air | Slight adhesion in case of wider strips and longer sealing time; no measurable strength; (<30 g./cm.) |
| Electrical discharge in chlorine gas. | >100–120 g./cm. (film tears); sealing capacity of treated film disappears after 3–10 days. |
| Electrical discharge with supply of sytrene. | Slight adhesion when sealing time is lengthened or pressure increased; <50 g./cm. |
| Electrical discharge in chlorine atmosphere with supply of styrene. | >100–150 g./cm. |

As can be seen from the table, good sealability is also achieved by electrical discharge in the presence of chlorine. However, the effect of increasing the sealing capacity is not permanent and disappears after 3 to 10 days.

This process can, therefore, be applied only when sealing takes place immediately subsequent to or a short period after the electrical treatment. In contrast to this, the improvement in sealability resulting from electrical discharge in a chlorine atmosphere in the presence of styrene is much more permanent, so that films treated in this manner can be stored for a prolonged period of time prior to heat-sealing without substantial loss of their heat-sealing capacity.

Compared with other processes, in which the sealing layer is applied from a solution or dispersion and dried, the process of the invention in which the heat-sealing layer is produced on the thermoplastic film by an electrical discharge in the presence of chlorine and a monomer has the advantage of simplicity and it also can be performed continuously in a simple manner. The process of the invention, which is described herein particularly with respect to its application to films, also can be applied to other shaped structures made from thermoplastic polymers, for example, sheets, tubes, pipes and fabrics.

The following examples further illustrate the invention:

EXAMPLE 1

A biaxially stretched polypropylene film having a thickness of 12$\mu$ is passed over an insulated roller and beneath an electrode comprising 3 tensioned copper wires having a diameter of about 1 mm. and a length of 300 mm. The distance between the film and the electrode is 0.8 to 1 mm. The electrode wires are enclosed in a box made of insulating material into which chlorine gas and nitrogen (which has been passed through a 5% solution of hexachlorobutadiene in trichloroethylene) are introduced simultaneously at a rate of 200 liters each per hour. The velocity is 7 m./min. The electrical discharge is produced by a 5 kilocycle generator (potential difference between electrodes: 8 kilovolts; electrode current: 40–50 ma.).

A sealing strength of 150 g./cm. was obtained after sealing had been performed at 135° C. under a pressure of 1.3 kp./cm.$^2$ for a period of 2 seconds. The test specimens still could be sealed after a storage period of more than 8 weeks. The sealing strength was only 20 to 30 g./cm. when the treatment was performed in the absence of chlorine. When the treatment was performed without hexachlorobutadiene, the sealability disappeared after a storage time of 7 days.

EXAMPLE 2

An unstretched polyethylene film having a thickness of 50$\mu$ and made from material having a density of 0.924 is treated with an electrical discharge in the presence of chlorine and styrene in the manner described in Example 1. A sealing strength of 500 g./cm. is obtained after sealing at 90° C. under a pressure of 1.3 kp./cm.$^2$ for a period of 1 to 5 seconds.

Although untreated polyethylene film can be welded at a temperature, for example, of 120° C., it displays no sealability under the above conditions.

EXAMPLE 3

A biaxially stretched film 20$\mu$ thick made from low-pressure polyethylene, having a density of 0.95, was treated in the manner described in Example 1 at a speed of 10 m./min. The chlorine gas was introduced at a rate of 200 liters per hour. At the same time, nitrogen was conducted through a 15% solution of styrene in trichloroethylene and thence into the reaction zone at a rate of 200 liters per hour. Test specimens sealed on a laboratory sealing apparatus at 120° C. under a pressure of 1.3 kp./cm.$^2$ had a sealing strength of 180 to 200 g./cm. Untreated stretched polyethylene film sealed under these conditions displayed no sealability, and film subjected only to a corona discharge in air displayed a sealing strength of less than 20 g./cm.

It will be obvious to those skilled in the art that many modifications may be made within the scope of the present invention without departing from the spirit thereof, and the invention includes all such modification.

What is claimed is:

1. A process for the production of a sealable surface on a shaped structure made from a material selected from the group consisting of thermoplastic hydrocarbon polymers and polyethylene terephthalate which comprises exposing the material to an electrical discharge in an atmosphere containing a halogen gas and in the presence of a polymerizable monomer selected from the group consisting of acrylic acid and esters thereof, vinyl acetate, vinyl chloride, vinylidene chloride, styrene, maleic anhydride, hexachlorobutadiene, acrylonitrile, chloroacrylonitrile, and mixtures thereof.

2. A process according to claim 1 in which the shaped structure is a film.

3. A process according to claim 1 in which the shaped structure is a biaxially stretched polypropylene film.

4. A process according to claim 1 in which the shaped structure is an unstretched polyethylene film.

5. A process according to claim 1 in which the shaped structure is a biaxially stretched polyethylene film.

6. A process according to claim 1 in which the halogen is chlorine.

7. A process according to claim 1 in which the halogen is bromine.

8. A shaped structure made from a material selected from the group consisting of thermoplastic hydrocarbon polymers and polyethylene terephthalate and having a sealable surface thereon made by exposing the material to an electrical discharge in an atmosphere containing a halogen gas and in the presence of a polymerizable monomer selected from the group consisting of acrylic acid and esters thereof, vinyl acetate, vinyl chloride, vinylidene chloride, styrene, maleic anhydride, hexachlorobultadiene, acrylonitrile, chloroacrylonitrile, and mixtures thereof.

9. A shaped structure according to claim 8 having the form of a film.

10. A shaped structure according to claim 8 in which the shaped structure is a biaxially stretched polypropylene film.

11. A shaped structure according to claim 8 in which the shaped structure is an unstretched polyethylene film.

12. A shaped structure according to claim 8 in which the shaped structure is a biaxially stretched polyethylene film.

13. A shaped structure according to claim 8 in which the halogen is chlorine.

14. A shaped structure according to claim 8 in which the halogen is bromine.

References Cited

UNITED STATES PATENTS

| 3,245,896 | 4/1966 | James | 204—168 |
| 3,274,091 | 9/1966 | Ambroski | 117—93.1 |
| 3,275,540 | 9/1966 | McBride | 117—93.1 |

JOSEPH L. SCHOFER, *Primary Examiner.*

L. EDELMAN, *Assistant Examiner.*

U.S. Cl. X.R.

117—93.1; 204—165, 168; 260—75, 92.8, 94.7, 94.9, 873, 878